United States Patent
Chan et al.

(10) Patent No.: US 10,247,221 B2
(45) Date of Patent: Apr. 2, 2019

(54) HOUSING OF ACTIVE ELEMENT AND MANUFACTURING METHOD THEREOF

(71) Applicant: COOLER MASTER CO., LTD., New Taipei (TW)

(72) Inventors: Wei-Lung Chan, New Taipei (TW); Yu-Te Wei, New Taipei (TW)

(73) Assignee: COOLER MASTER CO., LTD., New Taipei (TW)

( * ) Notice: Subject to any disclaimer, the term of this patent is extended or adjusted under 35 U.S.C. 154(b) by 830 days.

(21) Appl. No.: 14/834,546

(22) Filed: Aug. 25, 2015

(65) Prior Publication Data
US 2016/0298671 A1 Oct. 13, 2016

(30) Foreign Application Priority Data

Apr. 10, 2015 (CN) .......................... 2015 1 0168978

(51) Int. Cl.
| | |
|---|---|
| *G06F 1/20* | (2006.01) |
| *F04D 25/06* | (2006.01) |
| *F04D 29/60* | (2006.01) |
| *F04D 29/66* | (2006.01) |
| *F16B 35/00* | (2006.01) |

(52) U.S. Cl.
CPC ........ *F16B 35/005* (2013.01); *F04D 25/0613* (2013.01); *F04D 29/601* (2013.01); *F04D 29/668* (2013.01); *G06F 1/20* (2013.01); *F05D 2300/501* (2013.01)

(58) Field of Classification Search
CPC .... F16B 35/005; F04D 29/668; F04D 29/601; F04D 29/0613; F04D 29/40; F04D 29/60; G06F 1/20

USPC .......................................................... 415/119
See application file for complete search history.

(56) References Cited

U.S. PATENT DOCUMENTS

2014/0182822 A1* 7/2014 Zeng ...................... G06F 1/203
165/122

FOREIGN PATENT DOCUMENTS

| CN | 201335041 Y | 10/2009 |
|---|---|---|
| CN | 103369997 A | 10/2013 |
| CN | 204226289 U | 3/2015 |
| DE | 202005011514 U1 | 10/2005 |

(Continued)

OTHER PUBLICATIONS

Machine Translation of DE 102008032439. 2010. Retrieved Jun. 25, 2018.*

*Primary Examiner* — Mark A Laurenzi
*Assistant Examiner* — Mickey H France
(74) *Attorney, Agent, or Firm* — Muncy, Geissler, Olds & Lowe, P.C.

(57) ABSTRACT

A housing of an active component, which is used to install an active source, includes a main portion and at least two fixing portions. The main portion has side walls. The active source is installed on the main portion. The Young's modulus of the material making the fixing portion is different from the Young's modulus of the material making the main portion. The fixing portion is formed with fixing holes, and is connected to the side wall of the main portion. It therefore provides better effects of shock proofing and shock isolation without unnecessary noise, and prevents a fixing element fixing the active component from being loosened, with enhanced stability of the active component. The present invention also provides a manufacturing method for housing of the active component.

14 Claims, 7 Drawing Sheets

(56) References Cited

FOREIGN PATENT DOCUMENTS

DE 102008032439 A1 1/2010
EP 1617085 A1 1/2006
TW M445644 U1 1/2013

\* cited by examiner

HOUSING OF ACTIVE ELEMENT AND MANUFACTURING METHOD THEREOF

BACKGROUND OF THE INVENTION

1. Field of the Invention

The present invention is related to a housing of an active element. In particular, the present invention relates to a housing and a manufacturing method thereof for shock-proofing and shock-isolation applied to an active element having an active source, such as a fan or liquid-cooling device.

2. Description of Related Art

Products providing electronic information, such as computers, are widely used. Because the requirements of the electronic information industry demand that the technology develop quickly, the operation speed is raised and access capacity is increased, which causes high temperature during high-speed operation. To take a computer host as an example, the central processing unit (CPU) produces the most heat. However, as the temperature of the CPU is raised higher and higher, the execution efficiency is lowered and can even cause a crash, and maybe even more damage in more serious situations.

Until now, a fan has usually been used to dissipate heat produced by the electronic element during operation of electronic information products. The conventional fan has a housing and a blade wheel (also called an active source). The blade wheel is rotatably disposed in the housing. The housing of the fan is integrally formed in one piece. The housing is formed with fixing holes, so that it can be directly fixed to heat-dissipating fins or the product's case by screws (or fixing elements) through the fixing holes. However, the fan is an active element, and the shock produced by the fans during operation at high-speed will be transferred to the heat-dissipating fins or the housing. Thus, the heat-dissipating fins or the housing produce resonance, so as to make unnecessary noise, and loosen the fixing element used to fix the fan. This is caused that the stability of the fan is reduced.

The conventional water cooling device is also used to dissipate heat produced by the electronic element during operation of electronic information products. The water cooling device is another kind of active element, and has the same problems mentioned above during operation.

Therefore, it is desirable to propose a novel housing for an active element to overcome the above-mentioned problems.

SUMMARY OF THE INVENTION

It is one objective of this invention to provide a housing of active element and a manufacturing method thereof, which has better shock-proofing and shock-isolation effectiveness, without unnecessary noise, and also avoid loosening a fixing element used to fix an active element, so as to enhance the stability of the active element.

In order to achieve the above objectives, the instant disclosure provides a housing of an active element, for receiving an active source therein, including a main portion and at least two retaining portions. The main portion has a side wall. The active source is disposed on the main portion. The at least two retaining portions and the main portion are made of materials having different Young's modulus respectively. The at least two retaining portions are connected to the side wall of the main portion.

In order to achieve the above objectives, the instant disclosure further provides a method of manufacturing a housing of an active element, including the steps as follows.

To provide a main portion and at least two retaining portions, the main portion and the at least two retaining portions made of materials having different Young's modulus, the main portion having a side wall. Then to connect the at least two retaining portions to the side wall of the main portion.

In one preferable embodiment, the Young's modulus of the material of the main portion is at least one to one hundred times over the Young's modulus of the material of the at least two retaining portions.

In one preferable embodiment, the Young's modulus of the material of the main portion is at least ninety to one hundred times over the Young's modulus of the material of the at least two retaining portions.

In one preferable embodiment, the at least two retaining portions respectively have a top surface and a bottom surface, and a fixing hole is formed between the top surface and the bottom surface. A fixing sleeve is disposed in the fixing hole, and the fixing sleeve is formed with a thru-hole therein.

Thus, the instant disclosure has advantages as follows.

The housing of active element of this instant disclosure includes a main portion and at least two retaining portions. The main portion and the retaining portion are made of materials with different Young's modulus (Y), so that the main portion and the retaining portion have different stiffness to absorb the shock of the active element during operation. Thus, the shock is not transferred to the retaining portion, heat-dissipating fins or housing . . . etc., so as to provide better shock-proofing and shock-isolation effectiveness and avoid unnecessary noise, and avoid loosening a fixing element used to fix an active element, so as to enhance the stability of the active element.

The instant disclosure can further provide a fixing sleeve disposed in the fixing hole, so that the fixing element can pass through the thru-hole of the fixing sleeve, and then be fixed to heat-dissipating fins or housing. The fixing sleeve can provide the function of strength compensation, so that the fixing element passes through the fixing sleeve and stably fixes the retaining portion to the heat-dissipating fins or housing.

For further understanding of the instant disclosure, reference is made to the following detailed description illustrating the embodiments and examples of the instant disclosure. The description is for illustrative purpose only and is not intended to limit the scope of the claim.

The aforementioned illustrations and following detailed descriptions are exemplary for the purpose of further explaining the scope of the instant disclosure. Other objectives and advantages related to the instant disclosure will be illustrated in the subsequent descriptions and appended drawings.

DETAILED DESCRIPTION OF THE PREFERRED EMBODIMENTS

First Embodiment

Figure 1:
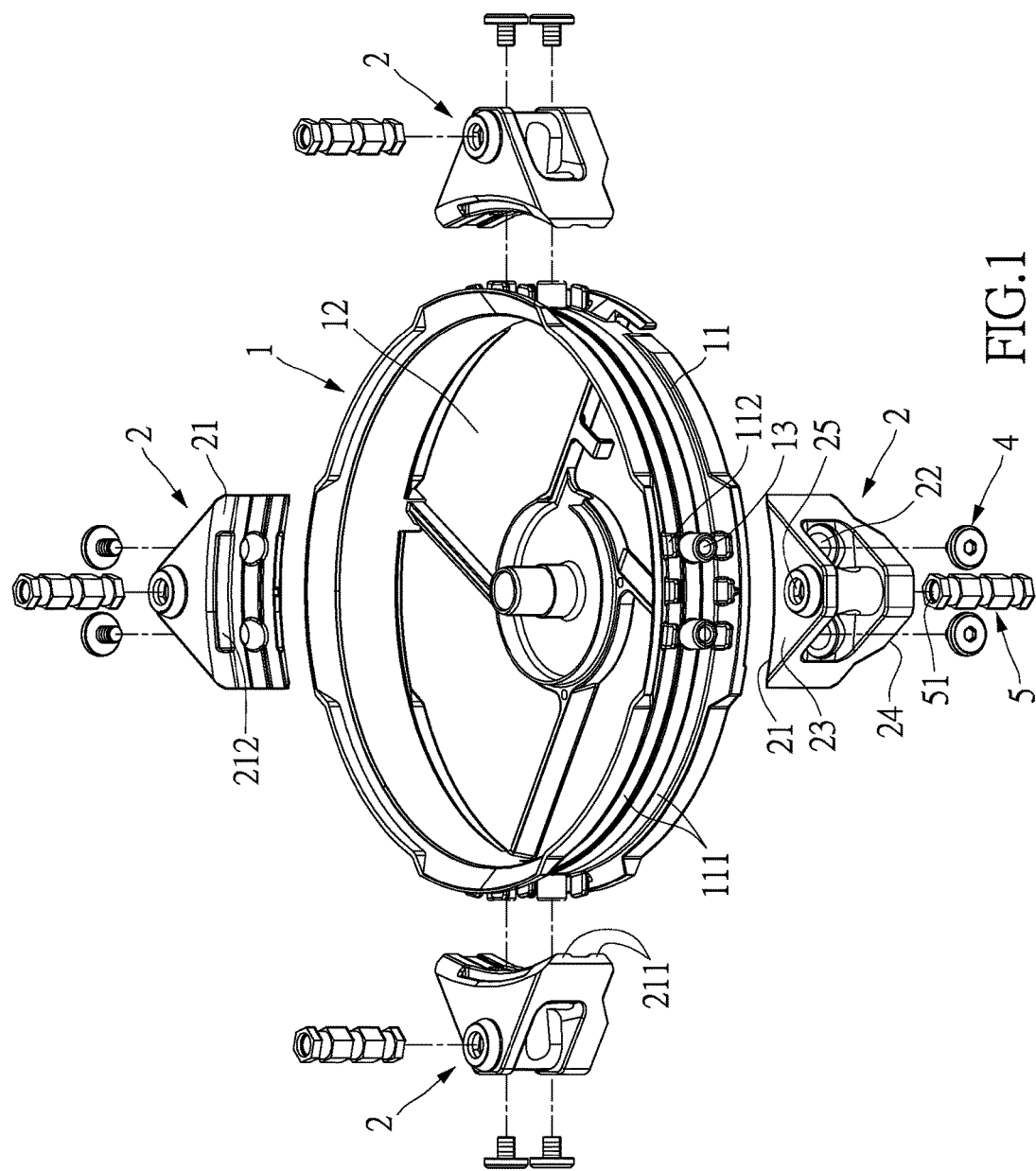
FIG. 1 is a perspective exploded view of the housing for an active element of a first embodiment according to the instant disclosure.
Figure 2:
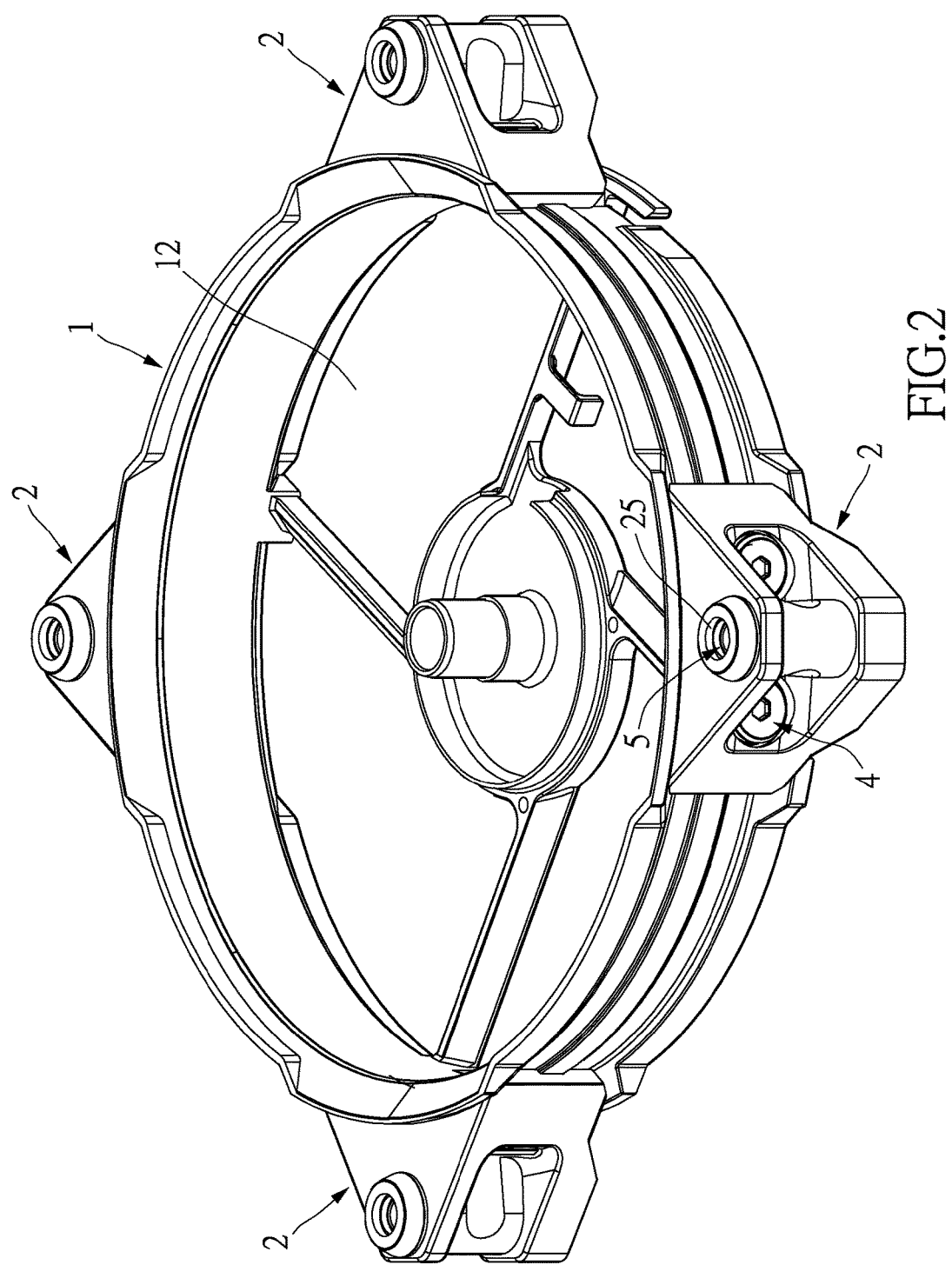
FIG. 2 is a perspective assembled view of the housing for an active element of a first embodiment according to the instant disclosure.

Please refer to FIG. 1 and FIG. 2. This present invention provides a housing for an active element. The active element could be a cooling fan or liquid-cooling heat-dissipating device . . . etc. In this embodiment, the active element is disclosed as a fan. The housing for the active element includes a main portion 1 and at least two retaining portions 2.

Figure 3:
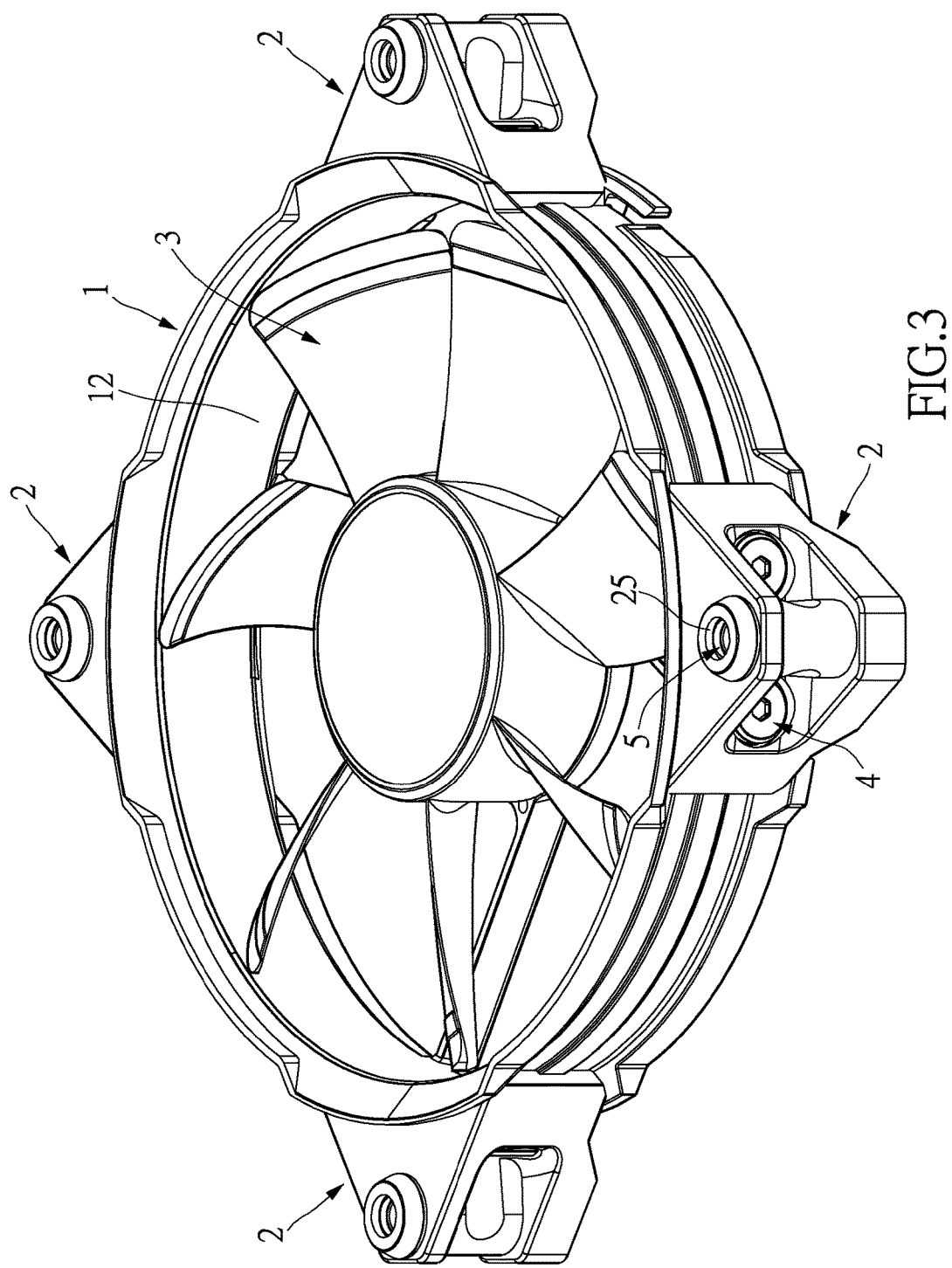
FIG. 3 is a perspective view of the housing for an active element assembled with a blade wheel of a first embodiment according to the instant disclosure.

The main portion 1 can be made of plastic, rubber or metal . . . etc. The material of the main portion 1 is not limited thereto. The main portion 1 can be circle-shaped, rectangular-shaped or other hollow shapes. The shape of the main portion 1 is not limited thereto. In this embodiment, the main portion 1 is hollow circle-shaped. The main portion 1 has a ring shaped side wall 11. The side wall 11 is formed with a receiving space 12 at an inner side thereof, in which a blade wheel 3 is received (as shown in FIG. 3). The blade wheel 3 includes blades and a motor structure (not shown), so that the blade wheel 3 is rotatably disposed in the receiving space 12 of the main portion 1. The blade wheel 3 is an active source.

The retaining portion 2 can be made of plastic, rubber or metal . . . etc. The material of the retaining portion 2 is not limited thereto. The main portion 1 and the retaining portion 2 are made of materials with different Young's modulus (Y). Young's modulus represents the stiffness of the material. In other words, the main portion 1 and the retaining portion 2 have different stiffness. The difference in Young's modulus between the main portion 1 and the retaining portion 2 is over one times, such as one, two to ten, twenty, thirty or fifty times, even to one hundred times . . . etc. A preferable difference is over at least ninety to one hundred times for providing better shock-proofing and shock-isolation effect. The Young's modulus of the material of the main portion 1 can be larger or smaller than the Young's modulus of the material of the retaining portion 2.

The shape of the retaining portion 2 is not limited according to this embodiment. In this embodiment, the retaining portion 2 is substantially triangular-shaped. The number of the retaining portions 2 can be two, three, or four, and is not limited. This embodiment has four retaining portions 2. The retaining portions 2 are separately arranged. The retaining portions 2 are connected to the side walls 11 of the main portion 1. Preferably, the retaining portions 2 are connected to outer edges of the side walls 11 of the main portion 1, but not limited thereto. Further, the retaining portion 2 could be arranged in symmetric manner or asymmetric manner.

The retaining portion 2 has one side adjoined to the main portion 1 which is formed with a contacting surface 21. The contacting surface 21 is shaped in a concave curve matching with an outer surface of the side wall 11, so that the contacting surface 21 of the retaining portion 2 is attached closely to the outer surface of the side wall 11 of the main portion 1. The outer surface of the side wall 11 of the main portion 1 is further formed with an orientation groove 111. The orientation groove 111 is extended along the outer surface of the side wall 11 of the main portion 1. In addition, the retaining portion 2 has an orientation rib 211 protruded from the contacting surface 21 corresponding to the orientation groove 111. Thus, the orientation rib 211 is positioned in the orientation groove 111 for orienting mutually. Moreover, the main portion 1 has a plurality of orientation protrusions 112 protruded from the outer surface of the side wall 11, and the retaining portion 2 has a plurality of orientation holes 212 formed on the contacting surface 21 corresponding to the orientation protrusions 112. The orientation protrusions 112 are positioned in the orientation hole 212 for orienting mutually, so that the contacting surface 21 of the retaining portion 2 can be quickly positioned on the outer surface of the side wall 11 of the main portion 1.

Figure 4:
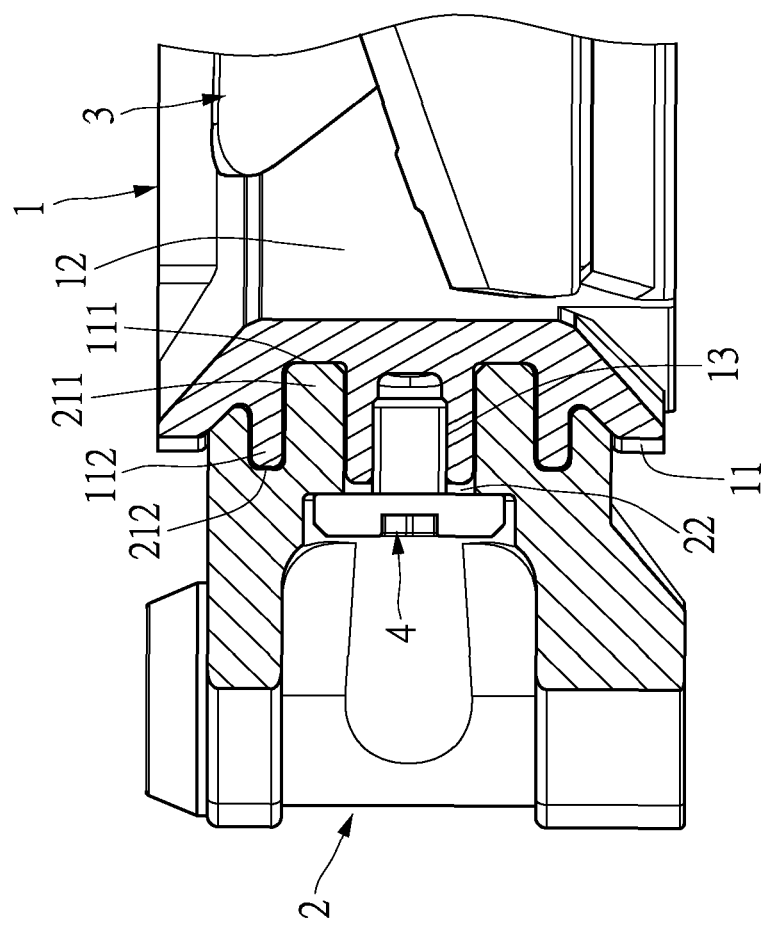
FIG. 4 is a partial cross-sectional view of the housing for an active element of a first embodiment according to the instant disclosure.

The retaining portion 2 is connected to the side wall 11 of the main portion 1, and the way of connecting is not limited. For example, screwing by screw, rivet jointing by rivet, welding, or mold injecting can be used to connect the side wall 11 of the main portion 1 to the retaining portion 2. This embodiment uses screws to screw the retaining portion 2 to the side wall 11 of the main portion 1. The retaining portion 2 is formed with two first connecting holes 22. The first connecting holes 22 are extended from the side wall 11 through the retaining portion 2 up to the contacting surface 21. In this embodiment, two screws 4 pass through the two first connecting holes 22 (as shown in FIG. 4) and are screwed fixedly to two second connecting holes 13 on the side wall 11 of the main portion 1. Thus, the retaining portion 2 can be screwed fixedly to the side wall 11 of the main portion 1 by screws 4. In another embodiment of this present disclosure, the screws 4 can be replaced by rivets, and the retaining portion 2 can be riveted fixedly to the side wall 11 of the main portion 1.

The retaining portion 2 has a top surface 23 and a bottom surface 24. A fixing hole 25 is formed between the top surface 23 and the bottom surface 24. The fixing hole 25 preferably is a circular hole, but is not limited thereto. The fixing hole 25 is extended from the top surface 23 to the bottom surface 24, so that a fixing element, such as a screw or fastener, can pass through the fixing hole 25 to fix the retaining portion 2 onto heat-dissipating fins or a housing. In this embodiment, a fixing sleeve 5 is further installed in the fixing hole 25, which can be made of plastic or metal. The fixing sleeve 5 is a hollow post, and is formed with a thru-hole 51 therethrough. The fixing sleeve 5 is embedded in the fixing hole 25. The fixing sleeve 5 preferably is a polygonal post, so that the fixing sleeve 5 can be stably disposed in the fixing hole 25 without rotation.

When setting up the active element, the fixing element (such as screw or fastener) can be passed through the thru-hole 51 of the fixing sleeve 5, and then fixed to heat-dissipating fins or a housing. If the retaining portion 2 is made of plastic with a lower stiffness, the fixing sleeve 5 can provide the function of strength compensation. The fixing element passes through the fixing sleeve 5 and stably fixes the retaining portion 2 to heat-dissipating fins or a housing. The retaining portion 2 can be treated as a connection medium between the fixing element and the main portion 1, and the fixing element is separated from the main portion 1 without contact. Therefore the shock can be isolated effectively with better shock-proofing and shock-isolation results.

Second Embodiment

Figure 5:
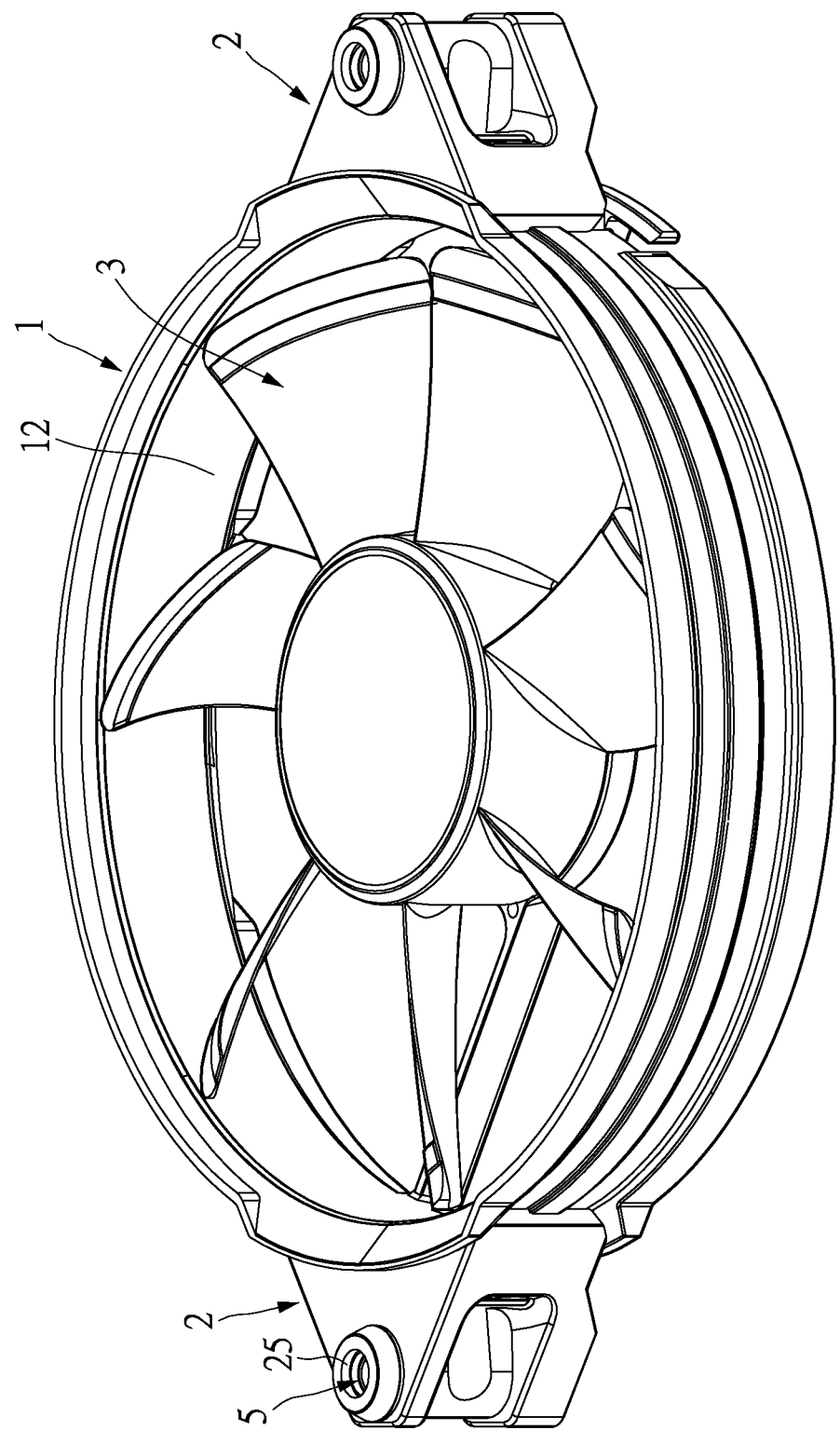
FIG. 5 is a perspective assembled view of the housing for an active element of a second embodiment according to the instant disclosure.

Please refer to FIG. 5, the main difference between this embodiment and the above embodiment is that this embodiment has two retaining portions 2, and the two retaining portions 2 are symmetrically arranged. The two retaining portions 2 are connected to the outer edge of the side wall 11 at two sides of the main portion 1. In this embodiment, the main portion 1 and the retaining portion 2 are made of materials having different Young's modulus, so that the main portion 1 and the retaining portion 2 have different stiffness.

Third Embodiment

Figure 6:
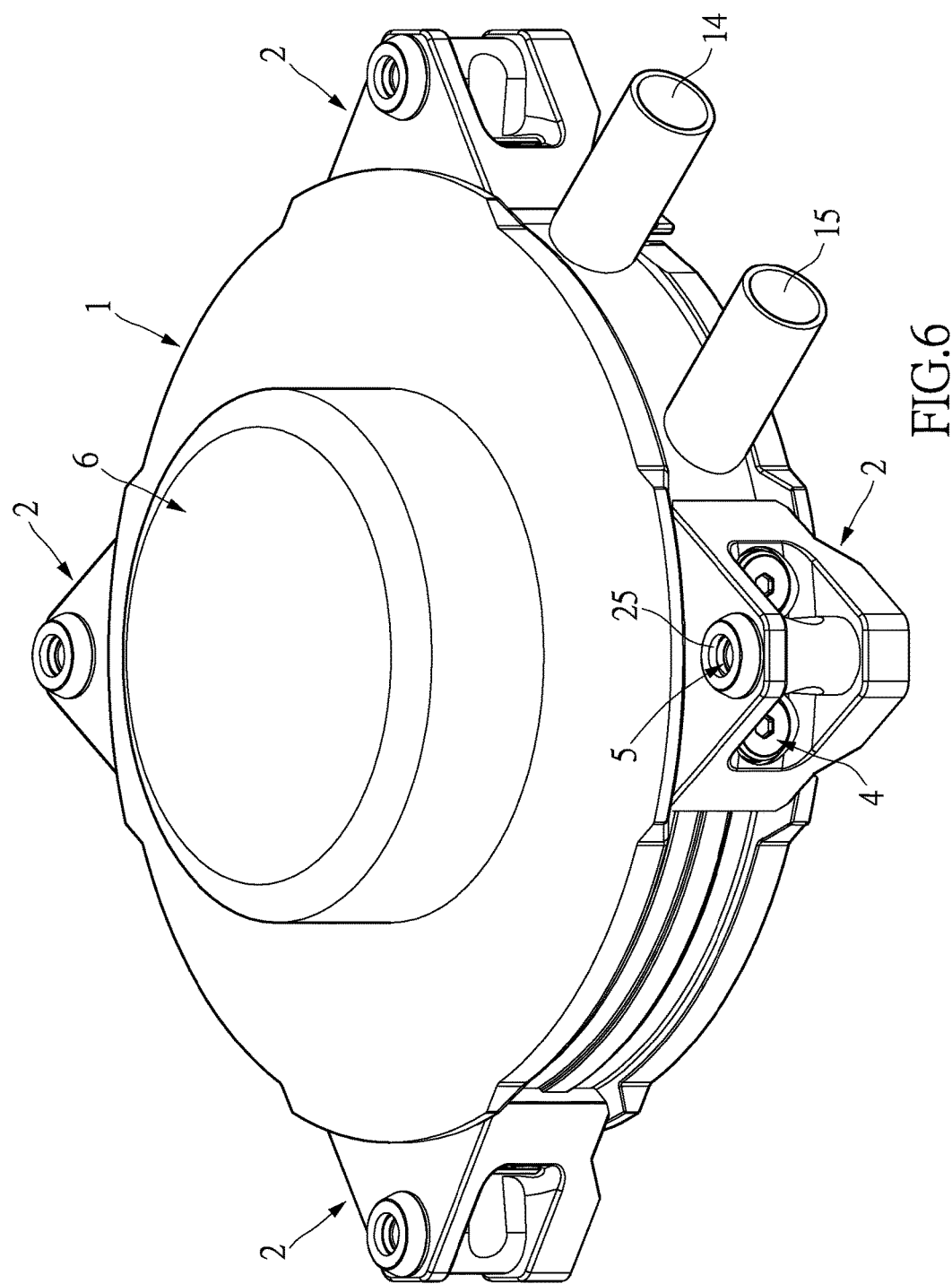
FIG. 6 is a perspective assembled view of the housing for an active element of a third embodiment according to the instant disclosure.

Please refer to FIG. 6. The active element of this embodiment is a liquid-cooling device. The housing of the active element, in this embodiment, includes a main portion 1 and at least two retaining portions 2. The materials of the main portion 1 and the retaining portion 2 are not limited. The main portion 1 and the retaining portion 2 are made of materials having different Young's modulus, so that the main portion 1 and the retaining portion 2 have different stiffness. The active element can be fixed to heat-dissipating fins or a housing by the retaining portion 2. The main portion 1 has a liquid inlet 14, a liquid outlet 15, and a pump 6 is assembled to the main portion 1. The pump 6 is an active source, so that the pump 6 can pump the cooling liquid from the liquid inlet 14 into the main portion 1 and drain the cooling liquid from the main portion 1 to the liquid outlet 15. It can dissipate heat by a liquid-cooling manner.

Fourth Embodiment

Figure 7:
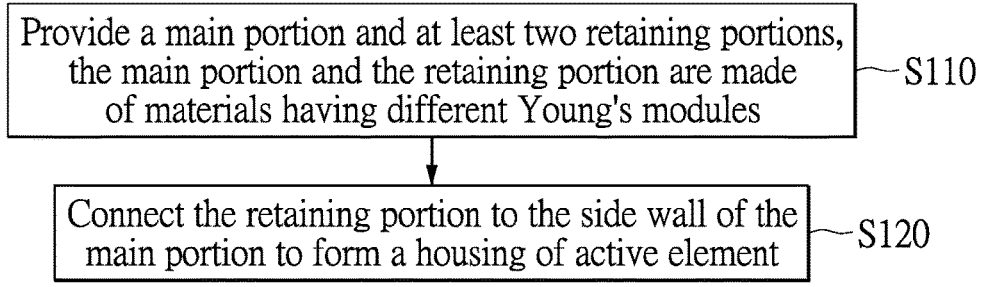
FIG. 7 is a flow chart of a method of manufacturing the housing for an active element according to the instant disclosure.

Please refer to FIG. 7. The method of manufacturing the housing of an active element in this embodiment is illustrated according to the above-mentioned housing of an active element. The first step S110 is shown in FIG. 1 and FIG. 2. A main portion 1 and at least two retaining portions 2 are provided. Materials of the main portion 1 and the retaining portion 2 are not limited. The main portion 1 and the retaining portion 2 are made of materials having different Young's modulus (Y), so that the main portion 1 and the retaining portion 2 have different stiffness. The main portion 1 has a side wall 11.

Following is step S120, to connect the retaining portion 2 to the side wall 11 of the main portion 1. The retaining portion 2 has a contacting surface 21 jointed closely to an outer surface of the side wall 11 of the main portion 1. Then, using screws for screwing, rivets for jointing, welding or mold injection to connect the side wall 11 of the main portion 1 with the retaining portion 2. This embodiment discloses screws for screwing fixedly the side wall 11 of the main portion 1 to the retaining portion 2. Two screws 4 pass through two first connecting holes 22 of the retaining portion 2, and are screwed to two second connecting holes 13 formed on the side wall 11 of the main portion 1 respectively. Thus, the retaining portion 2 can use screws 4 for screwing fixedly to the side wall 11 of the main portion 1, to form a housing of an active element.

Further, the retaining portion 2 is formed with a fixing hole 25. The fixing sleeve 5 is disposed in the fixing hole 25, and the fixing sleeve 5 is formed with a thru-hole 51. Thus, a fixing element passes through the thru-hole 51 of the fixing sleeve 5, and is fixed to heat-dissipating fins or housing. In this embodiment, the detailed structure of the main portion 1 and the retaining portion 2 are the same as the above embodiment, and so are not described redundantly.

The instant disclosure discloses the housing of an active element including the main portion 1 and at least two retaining portions 2. The main portion 1 and the retaining portion 2 are made of materials having different Young's modulus (Y), so that the main portion 1 and the retaining portions 2 have different stiffness. Thus, it can absorb shock produced by the active element (such as a fan or liquid-cooling device) during operation, and the shock will not be transferred to the retaining portion 2, the heat-dissipating fins or housing. The instant disclosure has better shock-proofing, shock-isolation effectiveness, without unnecessary noise, and avoids loosening the fixing element fixed to the active element, to enhance the stability of the active element.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A housing of an active component, for receiving an active source therein, comprising:

a main portion, having an axial direction and a side wall surrounding the axial direction of the main portion, wherein the active source is disposed on the main portion; and at least two retaining portions, the at least two retaining portions and the main portion made of materials having different Young's modulus respectively, the at least two retaining portions radially connected to the side wall of the main portion;

wherein each one of the at least two retaining portions has a contacting surface adjacent to the main portion, the contacting surface is jointed contiguously to an outer surface of the side wall of the main portion, each one of the at least two retaining portions has a first connecting hole, the first connecting hole is formed through the retaining portion to the contacting surface, and a screw passes through the first connecting hole to radially and fixedly screw to a second connecting hole formed on the side wall of the main portion, so that the retaining portion is screwed fixedly to the side wall of the main portion by the screw.

2. The housing of an active component, as claimed in claim 1, wherein the Young's modulus of the material of the main portion is greater than or equal to the Young's modulus of the material of the at least two retaining portions and is less than or equal to a hundredfold of the Young's modulus of the material of the at least two retaining portions.

3. The housing of an active component, as claimed in claim 2, wherein the Young's modulus of the material of the main portion is greater than or equal to the Young's modulus of the material of the main portions and is less than or equal to a hundredfold of the Young's modulus of the at least two retaining portions.

4. The housing of an active component, as claimed in claim 1, wherein the at least two retaining portions respectively have a top surface and a bottom surface, and a fixing hole is formed between the top surface and the bottom surface, and a fixing sleeve is disposed in the fixing hole, the fixing sleeve is formed with a thru-hole therein.

5. The housing of an active component, as claimed in claim 1, wherein the main portion has an orientation groove formed on the side wall, the orientation groove is extended along the side wall, the at least two retaining portions respectively have an orientation rib formed on the contacting surface correspondingly to the orientation groove, the orientation rib is positioned in the orientation groove for orienting mutually.

6. The housing of an active component, as claimed in claim 1, wherein the main portion has an orientation protrusion formed on an outer surface of the side wall, the at least two retaining portions respectively have an orientation hole formed on the contacting surface corresponding to the orientation protrusion, the orientation protrusion is positioned in the orientation hole for orienting mutually.

7. The housing of an active component, as claimed in claim 1, wherein the side wall is formed with a receiving space at an inner side thereof, the active source is a blade wheel, the blade wheel is rotatably disposed in the receiving space.

8. The housing of an active component, as claimed in claim 1, wherein the main portion has a liquid inlet and a liquid outlet, the active source is a pump.

9. A method of manufacturing a housing of an active component, comprising: providing a main portion and at least two retaining portions, the main portion and the at least two retaining portions made of materials having different Young's modulus, the main portion having a side wall; and connecting the at least two retaining portions to the side wall of the main portion;
wherein each one of the at least two retaining portions has a contacting surface adjacent to the main portion, the contacting surface is jointed contiguously to an outer surface of the side wall of the main portion, each one of the at least two retaining portions has a first connecting hole, the first connecting hole is formed through the retaining portion to the contacting surface, and a screw passes through the first connecting hole to radially and fixedly screw to a second connecting hole formed on the side wall of the main portion, so that the retaining portion is radially and fixedly screwed to the side wall of the main portion by the screw.

10. The method of manufacturing a housing of an active component as claimed in claim 9, wherein the Young's modulus of the material of the main portion is greater than or equal to the Young's modulus of the material of the at least two retaining portions and is less than or equal to a hundredfold of the Young's modulus of the material of the at least two retaining portions.

11. The method of manufacturing a housing of an active component as claimed in claim 10, wherein the Young's modulus of the material of the main portion is greater than or equal to the Young's modulus of the material of the main portions and is less than or equal to a hundredfold of the Young's modulus of the at least two retaining portions.

12. The method of manufacturing a housing of an active component as claimed in claim 9, wherein the at least two retaining portions respectively have a top surface and a bottom surface, a fixing hole is formed between the top surface and the bottom surface, a fixing sleeve is disposed in the fixing hole, the fixing sleeve is formed with a thru-hole.

13. The method of manufacturing a housing of an active component as claimed in claim 9, wherein the main portion has an orientation groove formed on the side wall, the orientation groove is extended along the outer surface of the side wall of the main portion, the at least two retaining portions respectively have an orientation rib formed on the contacting surface correspondingly to the orientation groove, the orientation rib is positioned in the orientation groove for orienting mutually.

14. The method of manufacturing a housing of an active component as claimed in claim 9, wherein the main portion has an orientation protrusion formed on the outer surface of the side wall, the at least two retaining portions respectively have an orientation hole formed on the contacting surface corresponding to the orientation protrusion, the orientation protrusion is positioned in the orientation hole for orienting mutually.

* * * * *